(12) United States Patent
Larson et al.

(10) Patent No.: US 8,203,806 B2
(45) Date of Patent: Jun. 19, 2012

(54) DISK DRIVE HAVING A HEAD LOADING/UNLOADING RAMP THAT INCLUDES A TORSIONALLY-COMPLIANT MEMBER

(75) Inventors: Nils E. Larson, San Jose, CA (US); John R. Edwards, Mountain View, CA (US); David K. Myers, Campbell, CA (US); Lidu Huang, Danville, CA (US); Scott E. Watson, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 975 days.

(21) Appl. No.: 12/135,454

(22) Filed: Jun. 9, 2008

(65) Prior Publication Data
US 2009/0303637 A1    Dec. 10, 2009

(51) Int. Cl.
*G11B 21/22* (2006.01)
*G11B 21/24* (2006.01)

(52) U.S. Cl. .................................. 360/254.9; 360/254.8
(58) Field of Classification Search ....... 360/254.3–255, 360/255.2–255.9
See application file for complete search history.

(56) References Cited

U.S. PATENT DOCUMENTS

| | | | | |
|---|---|---|---|---|
| 5,023,737 A * | 6/1991 | Yaeger | ........................ | 360/254.5 |
| 5,283,705 A * | 2/1994 | Iwabuchi | .................... | 360/254.4 |
| 5,831,795 A | 11/1998 | Ma et al. | | |
| 6,078,474 A | 6/2000 | Koyanagi et al. | | |
| 6,091,576 A | 7/2000 | Eckerd et al. | | |
| 6,246,534 B1 | 6/2001 | Gillis et al. | | |
| 6,301,081 B1 | 10/2001 | Fahey | | |
| 6,344,950 B1 | 2/2002 | Watson et al. | | |
| 6,452,753 B1 | 9/2002 | Hiller et al. | | |
| 6,473,268 B2 * | 10/2002 | Simozato | ................... | 360/254.3 |
| 6,549,377 B2 * | 4/2003 | Yoshida et al. | ............ | 360/254.3 |
| 6,570,741 B2 * | 5/2003 | Yamanouchi | .............. | 360/254.4 |
| 6,583,963 B2 * | 6/2003 | Boutaghou | ................ | 360/254.7 |
| 6,624,978 B1 * | 9/2003 | Fairchild | .................... | 360/254.6 |
| 6,690,548 B2 * | 2/2004 | Koyanagi et al. | .......... | 360/254.8 |

(Continued)

FOREIGN PATENT DOCUMENTS
JP  2007280517 A  * 10/2007

OTHER PUBLICATIONS

English-machine translation of JP 2007-280517 A to Sumiya et al., published on Oct. 25, 2007.*

*Primary Examiner* — Will J Klimowicz

(57) ABSTRACT

A disk drive includes a ramp having a fixed portion that is fixed to the disk drive base, and a guide portion that is not. The guide portion includes a guide surface having a parking region that is in contact with an HGA lift-tab with the disk drive in a non-operational state. The guide surface also has a load/unload region that extends over a disk outer periphery. The guide surface defines a guide surface length that is measured from the parking region to the load/unload region. The ramp also includes a torsionally-compliant member connecting the fixed portion to the guide portion. A distance between the torsionally-compliant member and the parking region, measured approximately parallel to the guide surface length, is less than half the guide surface length. The guide portion is not connected to the fixed portion over at least two-thirds of the guide surface length.

16 Claims, 4 Drawing Sheets

U.S. PATENT DOCUMENTS

| | | |
|---|---|---|
| 6,747,843 B2 | 6/2004 | Sharma et al. |
| 6,862,154 B1 | 3/2005 | Subrahmanyam et al. |
| 6,912,103 B1 | 6/2005 | Peng et al. |
| 2003/0043510 A1 | 3/2003 | Miyamoto et al. |
| 2005/0018354 A1 | 1/2005 | Takahashi |
| 2005/0237671 A1 | 10/2005 | Nguyen |
| 2006/0012919 A1 | 1/2006 | Choi et al. |
| 2006/0262448 A1 | 11/2006 | Okada et al. |
| 2006/0268462 A1 | 11/2006 | Ohwe |

* cited by examiner

DISK DRIVE HAVING A HEAD LOADING/UNLOADING RAMP THAT INCLUDES A TORSIONALLY-COMPLIANT MEMBER

FIELD OF THE INVENTION

The present invention relates generally to information storage devices, and in particular to disk drives having a ramp for supporting the lift-tab of a head gimbal assembly.

BACKGROUND

The typical hard disk drive includes a head disk assembly (HDA) and a printed circuit board (PCB) attached to a disk drive base of the HDA. The head disk assembly includes at least one disk (such as a magnetic disk, magneto-optical disk, or optical disk), a spindle motor for rotating the disk, and a head stack assembly (HSA). The spindle motor typically includes a rotating hub on which disks are mounted and clamped, a magnet attached to the hub, and a stator. Various coils of the stator are selectively energized to form an electromagnetic field that pulls/pushes on the magnet, thereby rotating the hub. Rotation of the spindle motor hub results in rotation of the mounted disks. The printed circuit board assembly includes electronics and firmware for controlling the rotation of the spindle motor, for controlling the position of the HSA, and for providing a data transfer channel between the disk drive and its host.

The head stack assembly typically includes an actuator, at least one head gimbal assembly (HGA), and a flex cable assembly. Each HGA includes a head for reading and writing data from and to the disk. In magnetic recording applications, the head typically includes an air bearing slider and a magnetic transducer that comprises a writer and a read element. The magnetic transducer's writer may be of a longitudinal or perpendicular design, and the read element of the magnetic transducer may be inductive or magnetoresistive. In optical and magneto-optical recording applications, the head may include a mirror and an objective lens for focusing laser light on an adjacent disk surface.

During operation of the disk drive, the actuator must rotate to position the heads adjacent desired information tracks on the disk. The actuator includes a pivot bearing cartridge to facilitate such rotational positioning. One or more actuator arms extend from the actuator body. An actuator coil is supported by the actuator body opposite the actuator arms. The actuator coil is configured to interact with one or more fixed magnets in the HDA, typically a pair, to form a voice coil motor. The printed circuit board assembly provides and controls an electrical current that passes through the actuator coil and results in a torque being applied to the actuator. A crash stop is typically provided to limit rotation of the actuator in a given direction, and a latch is typically provided to prevent rotation of the actuator when the disk drive is not in use.

Many modern HDAs include a ramp adjacent the disk outer periphery. In such HDAs, each HGA (itself attached to the distal end of an actuator arm in the HSA) typically includes a lift-tab. The lift-tab is designed to contact a lift-tab supporting surface of the ramp when the actuator moves near an extreme position that is typically beyond the disk outer periphery. To prevent the heads from sliding off of the outer edge of the disk before they are properly unloaded, a portion of the ramp (that includes a portion of the lift-tab supporting surface) typically must extend over the disk outer periphery. That portion of the ramp overlaps the disk.

Typically at the beginning of a period when the disk drive is not in use, the actuator rotates the HSA so that each HGA's lift-tab contacts a corresponding lift-tab supporting surface, in a lift-tab pick-up region of that lift-tab supporting surface, to unload the heads from the surface of the disk. Then the actuator continues to rotate so that each of the lift-tabs slides over the lift-tab supporting surface to a lift-tab parking region where it will remain while the disk drive is not in use.

The benefits of unloading the heads can include improved tribological performance and reliability of the head-disk interface and improved robustness to mechanical shocks that are suffered under non-operating conditions. For example, unloading and parking the heads can improve robustness to mechanical shocks during periods of disk drive non-operation because, when unloaded and parked, the heads are not physically adjacent disk surfaces. Therefore, the heads are less likely to impact and thereby damage the disk surface in response to mechanical shocks.

However, during periods of operation of the disk drive the ramp does not separate the heads from adjacent disk surfaces, so that the relative motion excited by mechanical shocks may cause the heads to slap adjacent disk surfaces, thereby damaging those surfaces. The relative motion excited by mechanical shocks during disk drive operation also may cause impacts between other HGA components (such as the swage plate) or HSA components (such as an actuator arm), and one or more adjacent disk surfaces. The relative motion excited by mechanical shocks may also cause impacts between the outer periphery of one or more disks and corresponding overlapping portion(s) of the ramp. Energy transferred from one disk drive component to another via such impacts can exacerbate the relative motion that leads to other, potentially more damaging impacts.

Impacts between the outer periphery of one or more disks and the overlapping portion(s) of the ramp may be avoided for some mechanical shocks via the nominal clearance between the two components. That is, if a mechanical shock is minor enough so that the total relative travel of the disk outer periphery relative to a corresponding overlapping portion of the ramp is less than the clearance between the two, then the disk outer periphery will not impact the corresponding overlapping portion of the ramp, and so further excitation of disk vibration from such an impact would be thereby avoided.

However, typical specifications for mechanical shock robustness in the disk drive industry continue to become more stringent, especially for disk drives designed for mobile applications. To meet such specifications the disk drive must be able to survive more severe mechanical shocks during operation and during non-operation. More severe shocks may cause impacts between the disk outer periphery and the ramp despite the existence of a nominal clearance between the two, and the nominal clearance may not be practically increased to the extent necessary to prevent such impacts because of dimensional constraints.

Thus, there is a need in the art for an improved ramp configuration that can reduce the consequence of impacts between the outer periphery of one or more disks and corresponding overlapping portion(s) of a ramp, due to mechanical shocks that may occur under operating conditions or non-operating conditions.

SUMMARY

A disk drive is disclosed and claimed. The disk drive includes a disk drive base, a spindle attached to the disk drive base, and a ramp. A disk is attached to the spindle, and the disk includes a disk outer periphery. An actuator is attached to the disk drive base, and a head gimbal assembly (HGA) is attached to the actuator. The HGA includes a lift-tab. The ramp includes a fixed portion that is fixed to the disk drive base, and a guide portion that is not fixed to the disk drive base. The guide portion includes a guide surface having a parking region that is in contact with the lift-tab with the disk drive in a non-operational state. The guide surface also has a load/unload region that extends over the disk outer periphery. The guide surface defines a guide surface length that is measured from the parking region to the load/unload region. The ramp also includes a torsionally-compliant member connecting the fixed portion to the guide portion. A distance between the torsionally-compliant member and the parking region, measured approximately parallel to the guide surface length, is less than half the guide surface length. The guide portion is not connected to the fixed portion over at least two-thirds of the guide surface length.

DESCRIPTION OF THE PREFERRED EMBODIMENTS

Figure 1:
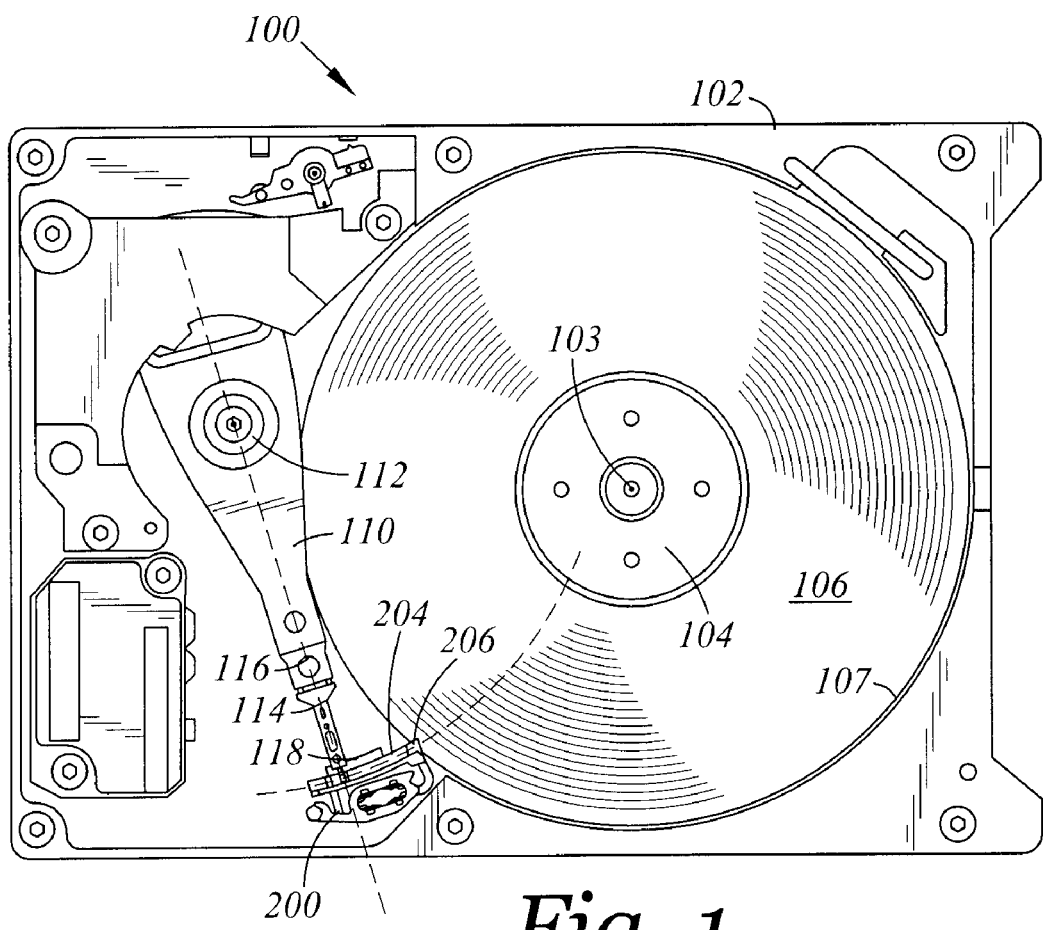
FIG. 1 is a top view of a disk drive according to an embodiment of the present invention.

FIG. 1 is a top view of a disk drive 100 according to an embodiment of the present invention. The disk drive comprises a disk drive base 102 and a spindle 104 attached to the disk drive base 102. The spindle 104 defines a spindle axis of rotation 103 (normal to the page in FIG. 1). A disk 106 has a first surface and an opposing second surface and is mounted on spindle 104. In contemporary magnetic hard disk drive applications, the disk 106 may comprise an aluminum, glass, or ceramic substrate, with the substrate being coated with a NiP under-layer, a thin-film magnetic layer, a diamond-like amorphous carbon protective layer, and a very thin lubricant layer. The disk 106 defines a disk outer periphery 107, and may be one of a plurality of disks mounted on spindle 104.

An actuator 110 is attached to the disk drive base 102. The actuator 110 is typically fabricated from aluminum, magnesium, beryllium, or stainless steel, and pivots about a pivot bearing 112 that is inserted as a cartridge into a bore in the actuator. The pivot bearing cartridge 112 is typically retained in the bore by a C-clip or tolerance ring but may be otherwise retained (e.g. by an adhesive).

Figure 2:
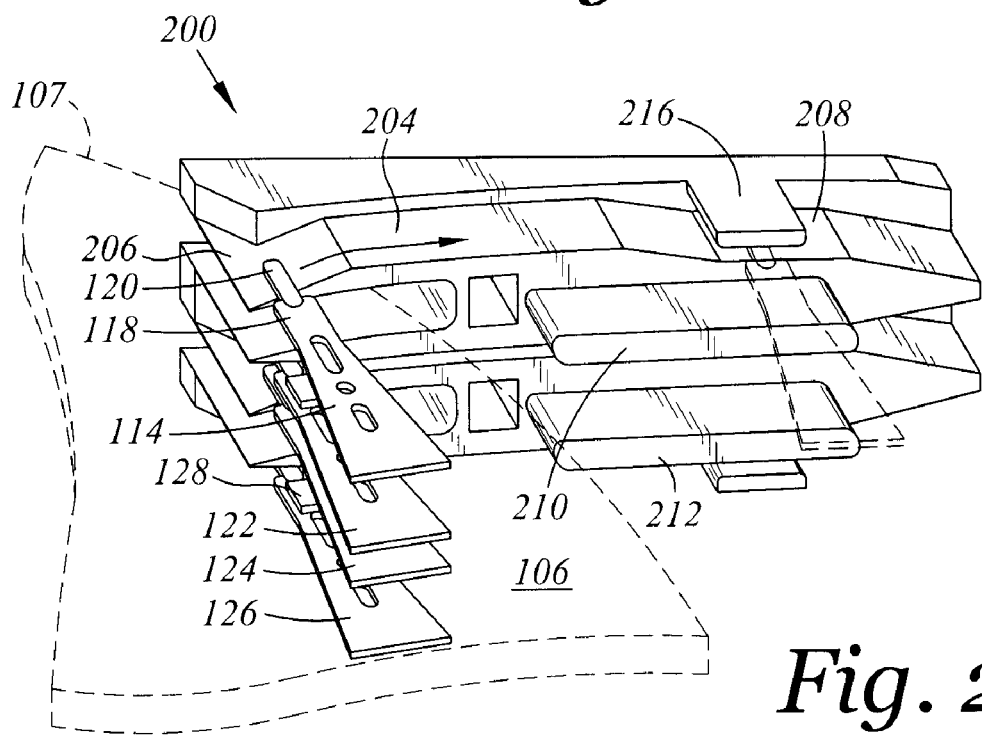
FIG. 2 is a perspective view of a portion of a disk drive, where a portion of a ramp is visible, according to an embodiment of the present invention.

Now referring to FIGS. 1 and 2, a head gimbal assembly (HGA) 114 includes a proximate end 116 that is attached to the actuator 110, and a distal end 118 that includes a lift-tab 120 that protrudes from HGA 114. In the embodiment of FIG. 2, each HGA 114, 122, 124, and 126 supports a read head near its distal end (e.g. HGA 126 supports read head 128). Each HGA includes a "gimbal" or "flexure" that includes conductive traces that electrically connect the read head to other circuitry in the disk drive (e.g. a preamp via a flex cable). The flexure also serves to attach the read head to the HGA in a compliant manner. For example, the read head may be glued and soldered to the flexure, and the flexure may be spot-welded to the remainder of the HGA. For simplicity, the flexure is not shown in FIGS. 1-2.

In the embodiment of FIGS. 1-2, lift-tab 120 is in contact with a guide surface 204 of a ramp 200. At the beginning of a period of non-operation of the disk drive 100, the actuator 110 swings the HGA 114 away from the spindle 104 and beyond the outer circumference 107 of disk 106. The lift-tab 120 then contacts the load/unload region 206 of the guide surface 204 (as shown in FIG. 2) to separate or "unload" the read head from the surface of the disk 106. After such unloading, the ramp 200 and its guide surface 204 supports the distal end 118 of HGA 114 via its lift-tab 120, rather than the disk 106 providing such support. Then the actuator 110 continues to swing the HGA 114 away from the spindle 104 and beyond the outer circumference 107 of disk 106, until the lift-tab 120 reaches a lift-tab parking region 208 of the guide surface 204 (as shown in FIG. 1). As can be seen in FIGS. 1-2, the lift-tab parking region 208 does not overlie any surface of disk 106.

The ramp 200 optionally but preferably includes some additional HGA motion-limiting features to protect the HGAs from damage during any mechanical shock event occurring during periods of non-operation of the disk drive 100. Such features are designed to interfere with extreme motions of the head and/or suspension assembly while the lift-tab 120 resides in the parking region 208 of the guide surface 204. For example, HGA limiter 210 may prevent head-to-head contact between HGA 114 and HGA 122 in response to mechanical shock. HGA limiter 212 may prevent head-to-head contact between HGA 124 and HGA 126 in response to mechanical shock. HGA limiter 216 may prevent excessive vertical deflection of HGA 114 in response to mechanical shock. That is, the presence of HGA limiter 216 may reduce the risk of a vertical deflection of HGA 114 that might exceed the elastic range of the suspension assembly of HGA 114.

Figure 3A:
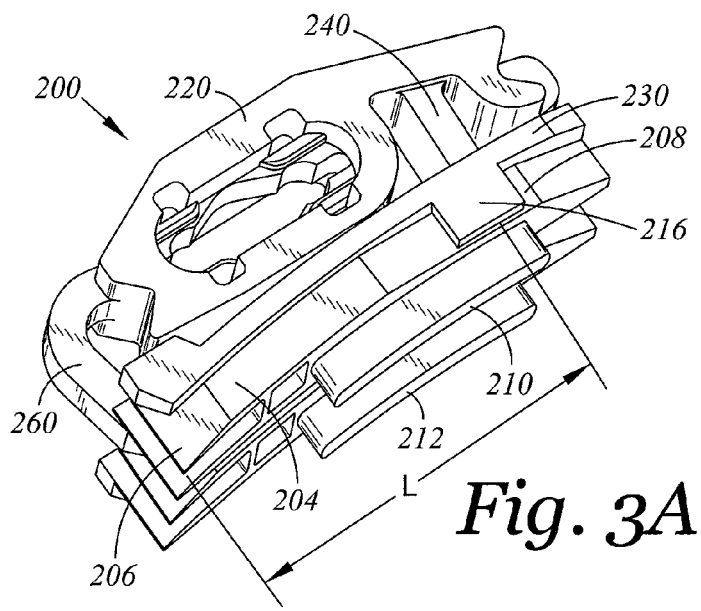
FIG. 3A is a top perspective view of a ramp according to an embodiment of the present invention.
Figure 3B:
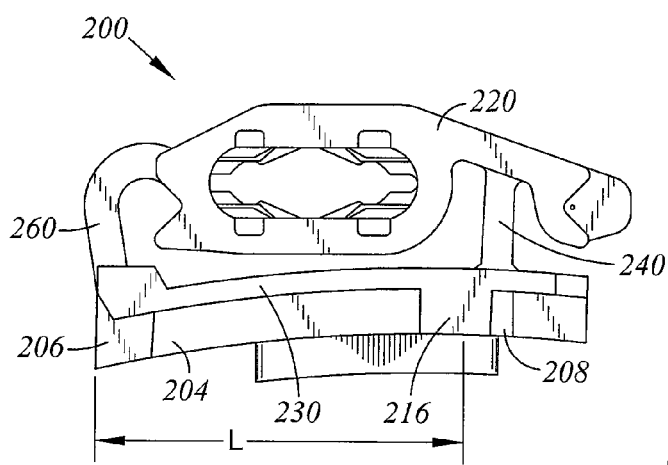
FIG. 3B is a top view of a ramp according to an embodiment of the present invention.

Now referring additionally to FIGS. 3A and 3B, the ramp 200 includes a fixed portion 220 that is fixed to the disk drive base 102, and a guide portion 230 that is not fixed to the disk drive base 102. The guide portion 230 includes the guide surface 204 having a parking region 208 that is in contact with the lift-tab 120 with the disk drive 100 in a non-operational state. As can also be seen in FIG. 2, the guide surface 204 may be one of a plurality of guide surfaces on the guide portion 230. The guide surface 204 includes load/unload region 206 that extends over the outer periphery 107 of disk 106. The guide surface 204 defines a guide surface length L that is measured from the parking region 208 to the load/unload region 206. Specifically, the guide surface length L is measured from a position within the parking region 208 where the heads come to rest when parked. In the embodiment of FIG. 3A, this position is located underneath the HGA the limiter 216. The ramp 200 also includes a torsionally-compliant member 240 connecting the fixed portion 220 to the guide portion 230.

In the embodiment of FIGS. 3A and 3B, a distance between the torsionally-compliant member 240 and the parking region 208, measured approximately parallel to the guide surface length L, is less than half the guide surface length L. Preferably, the distance between the torsionally-compliant member 240 and the parking region 208 is less than one-fourth of the guide surface length L. For example, the distance between the torsionally-compliant member 240 and the parking region 208 measured approximately parallel to the guide surface length L is preferably less than 5 mm. The guide portion 230 is not connected to the fixed portion 220 over at least two-thirds of the guide surface length L. Preferably, the guide portion 230 is not connected to the fixed portion 220 over at least three-fourths of the guide surface length L.

Figure 3C:
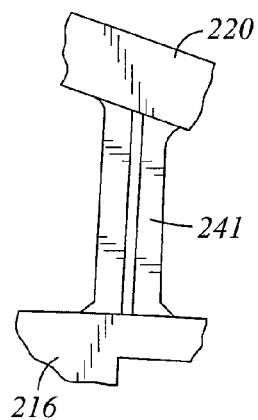

In the embodiment of FIGS. 3A and 3B, the torsionally-compliant member 240 comprises a torsional beam, however in an alternative embodiment (e.g. FIG. 3C) the torsionally-compliant member (e.g. 241) may comprise a plurality of beams, bending of which permits torsion of the guide portion 230 relative to the fixed portion 220. Preferably, in the embodiment of FIGS. 3A and 3B the torsionally-compliant member 240 has a torsional stiffness that is high enough for the guide portion 230 to resist deflection of the load/unload region 206 parallel to the spindle axis of rotation 103 by at least 5 kN/m. Also, preferably the torsional stiffness of the torsionally-compliant member 240 is low enough for the guide portion 230 to resist deflection of the load/unload region 206 parallel to the spindle axis of rotation 103 by no more than 25 kN/m. For example, if the material from which ramp 200 is fabricated has a Young's modulus, measured at room temperature (e.g. 70° F.) rather than [[a]] an elevated operating temperature, between 1.0 GPa to 6 GPa, then the torsionally-compliant member 240 preferably has a total cross sectional area in the range 2 mm$^2$ to 9 mm$^2$.

In the embodiment of FIGS. 3A and 3B, ramp 200 further includes a positioning member 260 attached to the fixed portion 220 and attached to the guide portion 230. The length, shape, and cross-section of positioning member 260 are preferably chosen (e.g. using conventional beam theory and/or finite element analysis) so that the torsional stiffness of positioning member 260 is less than one-fifth the torsional stiffness of the torsionally-compliant member 240. Preferably, the fixed portion 220, the guide portion 230, the positioning member 260, and the torsionally-compliant member 240 are monolithic in construction (i.e. are a single component with material continuity rather than being an assembly of subcomponents).

The ramp 200 may be fabricated from any suitable material having acceptable cost, dimensional stability, and tribological characteristics, although a material that can be injection molded is preferred. For example, the ramp 200 may comprise polyoxymethylene (POM), polycarbonate, a liquid crystal polymer (LCP), nylon, an acetyl resin plastic or acetyl homopolymer, and/or polyetherimide, among other materials. Preferably, the ramp material has a Young's modulus between 1.0 GPa to 6 GPa for convenience in the selection of the dimensions of the torsionally-compliant member 240.

Figure 4A:
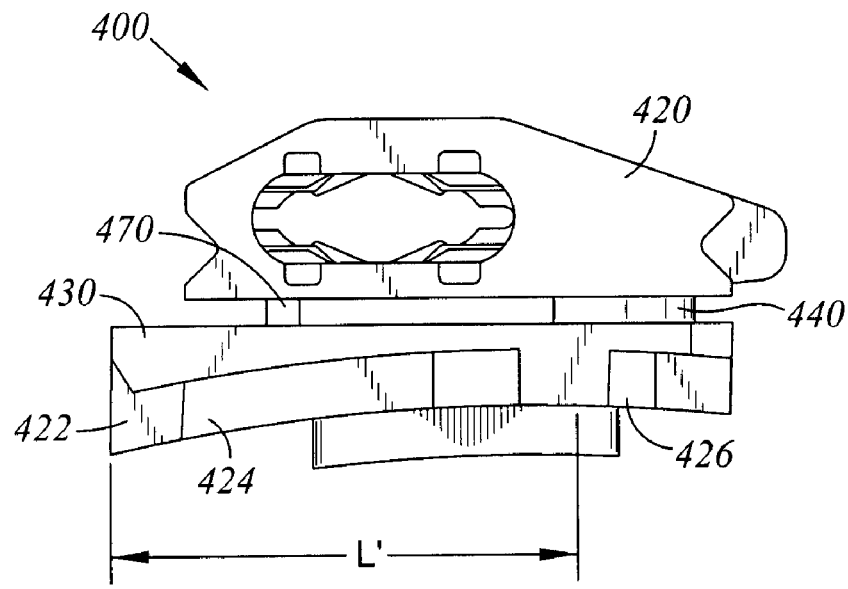
FIG. 4A is a top view of a ramp according to an embodiment of the present invention.
Figure 4B:
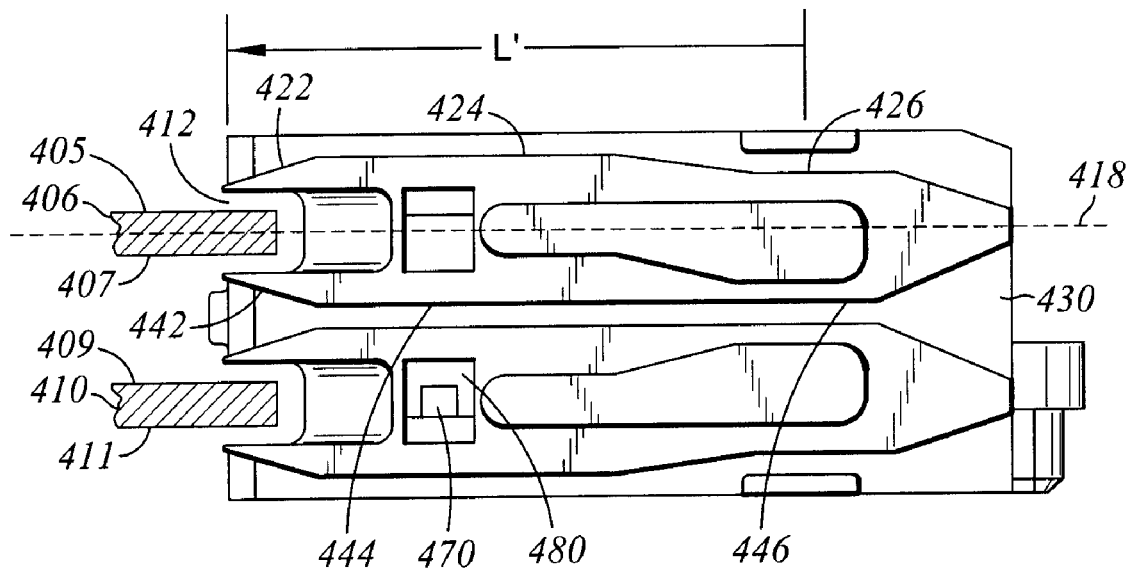
FIG. 4B is a side view of a ramp according to an embodiment of the present invention, shown in the context of a partial side cross-sectional view of two disks.

Now referring to FIGS. 4A and 4B, a ramp 400 according to another embodiment of the present invention is shown. The ramp 400 includes a fixed portion 420 that is fixed to the disk drive base (e.g. disk drive base 102), and a guide portion 430 that is not fixed to the disk drive base. The ramp 400 also includes a torsionally-compliant member 440 connecting the fixed portion 420 to the guide portion 430.

In FIG. 4B the ramp 400 is shown in relation to a first disk 406 having an upper surface 405 and a lower surface 407, and a second disk 410 having an upper surface 409 and a lower surface 411. The guide portion 430 of ramp 400 includes a first guide surface 424 that includes a first load/unload region 422 that extends over the outer periphery of first disk 406 to overlie the upper surface 405 of the first disk 406. The guide portion 430 also includes a first lift-tab parking region 426 that does not overlie any disk surface. The first guide surface 424 defines a guide surface length L' that is measured from the parking region 426 to the load/unload region 422.

In the embodiment of FIGS. 4A and 4B, a distance between the torsionally-compliant member 440 and the parking region 426, measured approximately parallel to the guide surface length L', is less than half the guide surface length L'. Preferably, the distance between the torsionally-compliant member 440 and the parking region 426 is less than one-fourth of the guide surface length L'. For example, the distance between the torsionally-compliant member 440 and the parking region 426 measured approximately parallel to the guide surface length L' is preferably less than 5 mm. The guide portion 430 is not connected to the fixed portion 420 over at least two-thirds of the guide surface length L'. Preferably, the guide portion 430 is not connected to the fixed portion 420 over at least three-fourths of the guide surface length L'.

In the embodiment of FIGS. 4A and 4B, the torsionally-compliant member 440 comprises a torsional cylinder having a round cross section, however other cross sectional shapes are possible and in an alternative embodiment the torsionally-compliant member 440 may comprise a plurality of beams, bending of which permits torsion of the guide portion 430 relative to the fixed portion 420. Preferably, in the embodiment of FIGS. 4A and 4B the torsionally-compliant member 440 has a torsional stiffness that is high enough for the guide portion 430 to resist deflection of the load/unload region 422 normal to plane 418 by at least 5 kN/m. Also, preferably the torsional stiffness of the torsionally-compliant member 440 is low enough for the guide portion 430 to resist deflection of the load/unload region 422 normal to plane 418 by no more than 25 kN/m. For example, if the material from which ramp 400 is fabricated has a Young's modulus between 1.0 GPa to 6 GPa, then the torsionally-compliant member 440 preferably a total cross sectional area in the range 2 mm$^2$ to 9 mm$^2$.

Also in the embodiment of FIG. 4B, the guide portion 430 also includes a second guide surface 444 that includes a second load/unload region 442 that extends over the outer periphery of disk 406 to overlie the lower surface 407 of the first disk 406. The guide portion 430 also includes a second lift-tab parking region 446 that does not overlie any disk surface. Note that the terms "over" and "overlie" as used herein do not imply any relative position with respect to gravity, rather they only imply a relative position with respect to a direction that is orthogonal to the disk surfaces (e.g. orthogonal to plane 418 that bisects the recession 412 that accommodates disk 406) and is therefore parallel to the spindle axis of rotation (e.g. spindle axis of rotation 103).

In the present description of the embodiment of FIGS. 4A and 4B, the "first load/unload region" could as well be considered as the load/unload region that overlies the disk surface that is closest to the disk drive base (e.g. the lower surface 411 of the second disk 410). If that were the case for the embodiment of FIGS. 4A and 4B, then the "second load/unload region" would be considered as the lift-tab pick-up region that overlies the upper surface 409 of the second disk 410.

In the embodiment of FIGS. 4A and 4B, the fixed portion includes a projection 470 that has at least one limiter surface that is disposed to be contacted by the guide portion 430 if a maximum torsional deflection of the guide portion 430 is exceeded. Specifically, in the embodiment of FIGS. 4A and 4B, the projection 470 extends from the fixed portion 420 into a hole 480 in the guide portion 430, so that the upper surface of projection 470 may contact the guide portion 430 at the top of hole 480 to prevent counter-clockwise (in FIG. 4B) torsional deflection of the guide portion 430 beyond a desired maximum. Alternatively, the lower surface of projection 470 may contact the guide portion 430 at the bottom of hole 480 to prevent clockwise (in FIG. 4B) torsional deflection of the guide portion 430 beyond a desired maximum. For example, in the embodiment of FIGS. 4A and 4B, projection 470 and hole 480 are preferably sized so that a maximum deflection of the load/unload region 422 of the guide portion 430 measured parallel to the spindle axis of rotation (i.e. normal to plane 418) is at least 100 microns. For example, in the embodiment of FIGS. 4A and 4B the hole 480 is preferably larger than the projection by a clearance that is at least 50 microns.

Figure 5A:
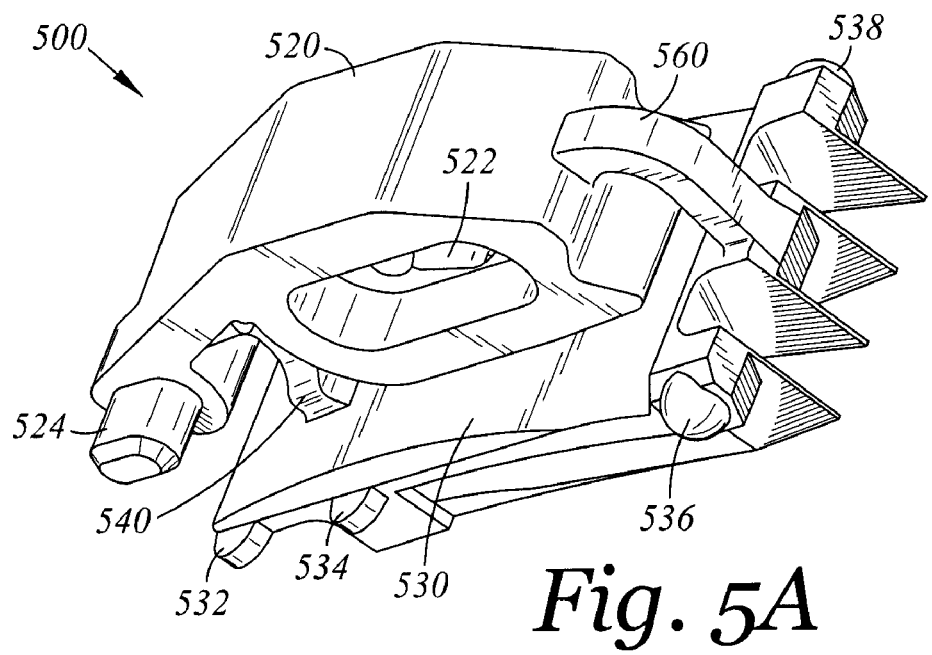
FIG. 5A is a bottom perspective view of a ramp according to an embodiment of the present invention.
Figure 5B:
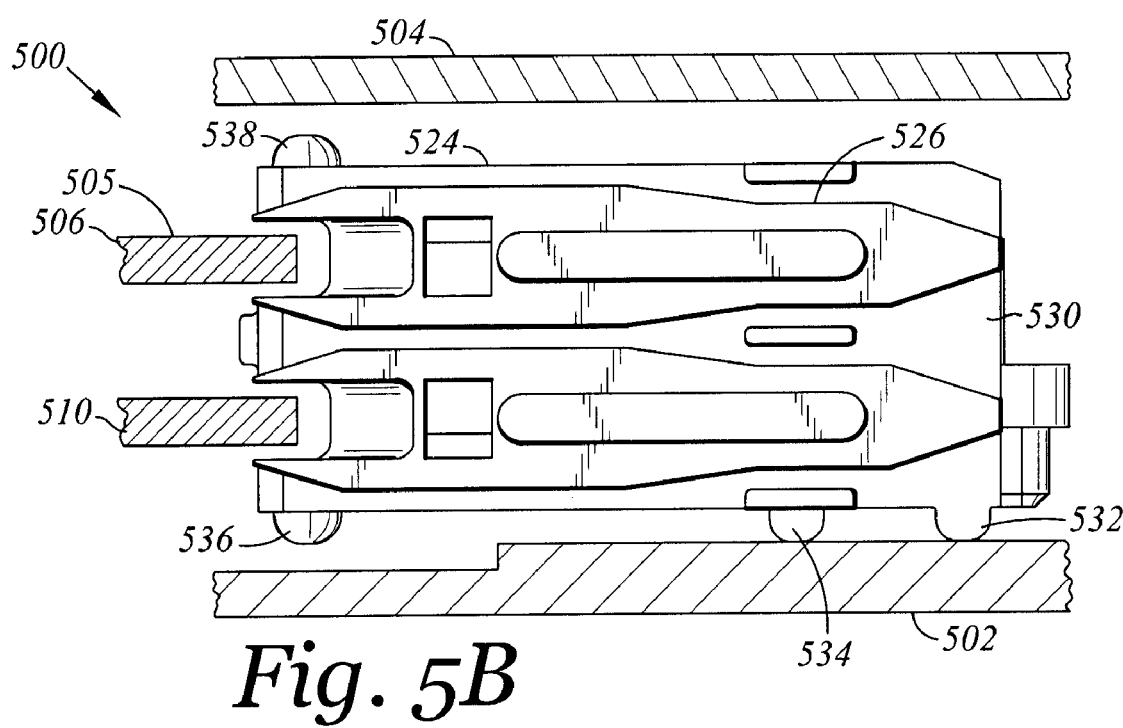
FIG. 5B is a side view of a ramp according to an embodiment of the present invention, shown in the context of a partial side cross-sectional view of some other disk drive components.

FIGS. 5A and 5B depict a ramp 500 according to another embodiment of the present invention. Ramp 500 includes a fixed portion 520 and a guide portion 530 connected by a torsionally-compliant member 540 and by a positioning member 560. The fixed portion 520 is connected to the disk drive base 502 by a peg 524 that enters a mating hole or depression in the disk drive base 502, and by a conventional fastener (not shown) that passes through the slot 522 and attaches to the disk drive base 502.

In the embodiment of FIGS. 5A and 5B, the guide portion 530 includes two fulcrum protrusions 532 and 534 that contact but are not fixed to the disk drive base 502 with the guide portion 530 in a normal operating position. The contact between fulcrum protrusions 532 and 534 under normal operating conditions (e.g. in the absence of externally-applied mechanical shocks) may help to ensure approximate parallelism between a portion of guide surface 524 and an associated disk surface (e.g. surface 505 of disk 506). However, under conditions of severe mechanical shock, the torsionally-compliant member 540 may allow the guide portion 530 of ramp 500 to pivot counter-clockwise (in FIG. 5B) about the contact between fulcrum protrusion 534 and disk drive base 502 to reduce the intensity of contact between guide portion 530 and one or more of disks 506, 510. Alternatively or in addition, under conditions of severe mechanical shock, the torsionally-compliant member 540 may allow the guide portion 530 of ramp 500 to pivot clockwise (in FIG. 5B) about the contact between fulcrum protrusion 532 and disk drive base 502 to reduce the intensity of contact between guide portion 530 and one or more of disks 506, 510.

Also in the embodiment of FIGS. 5A and 5B the guide portion 530 further includes a vertical stopper protrusion 536 that does not contact the disk drive base 502 with the guide portion 530 in a normal operating position (e.g. in the absence of externally-applied mechanical shocks). The vertical stopper protrusion 536 may contact the disk drive base 502 with the guide portion 530 in an extreme counter-clockwise (in FIG. 5B) rotational position, which could occur under conditions of extreme mechanical shock. Also in the embodiment of FIGS. 5A and 5B the guide portion 530 further includes a vertical stopper protrusion 538 that does not contact the disk drive cover 504 with the guide portion 530 in a normal operating position (e.g. in the absence of externally-applied mechanical shocks). The vertical stopper protrusion 538 may contact the disk drive cover 504 with the guide portion 530 in an extreme clockwise (in FIG. 5B) rotational position, which could occur under conditions of extreme mechanical shock.

In the foregoing specification, the invention is described with reference to specific exemplary embodiments thereof, but those skilled in the art will recognize that the invention is not limited thereto. It is contemplated that various features and aspects of the above-described invention may be used individually or jointly and possibly in an environment or application beyond those described herein. The specification and drawings are, accordingly, to be regarded as illustrative and exemplary rather than restrictive. The terms "comprising," "including," and "having," as used herein, are intended to be read as open-ended terms.

We claim:

1. A disk drive comprising:
   a disk drive base;
   a spindle attached to the disk drive base;
   a disk attached to the spindle, the disk including a disk outer periphery;
   an actuator attached to the disk drive base;
   a head gimbal assembly (HGA) attached to the actuator, the HGA including a lift-tab; and
   a ramp including:
      a fixed portion that is fixed to the disk drive base;
      a guide portion that is not fixed to the disk drive base, the guide portion including a guide surface having a parking region that is in contact with the lift-tab with the disk drive in a non-operational state, the guide surface also having a load/unload region that extends over the disk outer periphery, the guide surface defining a guide surface length that is measured from the parking region to the load/unload region; and
      a torsionally-compliant member connecting the fixed portion to the guide portion, a distance between the torsionally-compliant member and the parking region measured approximately parallel to the guide surface length being less than half the guide surface length;
      wherein the guide portion is not connected to the fixed portion over at least two-thirds of the guide surface length, and
      wherein the fixed portion includes at least one limiter surface that is disposed to be contacted by the guide portion if a maximum torsional deflection of the guide portion is exceeded.

2. The disk drive of claim 1 wherein the spindle defines a spindle axis of rotation, and wherein the torsionally-compliant member has a torsional stiffness that is high enough for the guide portion to resist deflection of the load/unload region parallel to the spindle axis of rotation by at least 5 kN/m, but wherein the torsional stiffness of the torsionally-compliant member is low enough for the guide portion to resist deflection of the load/unload region parallel to the spindle axis of rotation by no more than 25 kN/m.

3. The disk drive of claim 2 further comprising a positioning member attached to the fixed portion and attached to the guide portion, the positioning member having a torsional stiffness that is less than one-fifth the torsional stiffness of the torsionally-compliant member.

4. The disk drive of claim 3 wherein the fixed portion, the guide portion, the torsionally-compliant member, and the positioning member are a single component with material continuity rather than being an assembly of subcomponents.

5. The disk drive of claim 1 wherein the guide surface is one of a plurality of guide surfaces on the guide portion.

6. The disk drive of claim 1, wherein the spindle defines a spindle axis of rotation, and wherein a maximum deflection of the load/unload region of the guide portion measured parallel to the spindle axis of rotation is at least 100 microns.

7. The disk drive of claim 1 wherein the limiter surface is a surface of a projection extending from the fixed portion into a hole in the guide portion, the hole being larger than the projection by a clearance that is at least 50 microns.

8. The disk drive of claim 1 wherein the guide portion is not connected to the fixed portion over at least three-fourths of the guide surface length.

9. The disk drive of claim 1 wherein the distance between the torsionally-compliant member and the parking region is less than one-fourth of the guide surface length.

10. The disk drive of claim 1 wherein the distance between the torsionally-compliant member and the parking region measured approximately parallel to the guide surface length is less than 5 mm.

11. The disk drive of claim 1 wherein the ramp comprises a material selected from the group consisting of polyoxymethylene, polycarbonate, polyetherimide, liquid crystal polymer, nylon, and acetyl resin plastic.

12. The disk drive of claim 11 wherein the fixed portion, the guide portion, and the torsionally-compliant member are a single component with material continuity rather than being an assembly of subcomponents.

13. The disk drive of claim 1 wherein the ramp material has a Young's modulus between 1.0 GPa to 6 G Pa.

14. The disk drive of claim 1 wherein the torsionally-compliant member comprises a torsional beam.

15. The disk drive of claim 12 wherein the torsionally-compliant member has a total cross sectional area in the range 2 $mm^2$ to 9 $mm^2$.

16. The disk drive of claim 1 wherein the torsionally-compliant member comprises a plurality of beams, bending of which permits torsion of the guide portion relative to the fixed portion.

* * * * *